United States Patent
Wu et al.

(10) Patent No.: US 9,056,778 B2
(45) Date of Patent: Jun. 16, 2015

(54) NANO-GRAPHITE PLATE STRUCTURE

(71) Applicant: Enerage Inc., Wujie Township, Yilan County (TW)

(72) Inventors: Mark Y. Wu, Wujie Township, Yilan County (TW); Cheng-Yu Hsieh, Wujie Township, Yilan County (TW); Geng-Wei Lin, Wujie Township, Yilan County (TW); Ping-Yun Yeh, Wujie Township, Yilan County (TW)

(73) Assignee: Enerage Inc., Wujie Township, Yilan County (TW)

( * ) Notice: Subject to any disclaimer, the term of this patent is extended or adjusted under 35 U.S.C. 154(b) by 160 days.

(21) Appl. No.: 13/862,274

(22) Filed: Apr. 12, 2013

(65) Prior Publication Data
US 2014/0308522 A1    Oct. 16, 2014

(51) Int. Cl.
*C01B 31/04* (2006.01)
*B82Y 30/00* (2011.01)

(52) U.S. Cl.
CPC ............. *C01B 31/0438* (2013.01); *B82Y 30/00* (2013.01); *Y10S 977/734* (2013.01); *Y10S 977/753* (2013.01); *Y10S 977/932* (2013.01); *Y10S 977/948* (2013.01); *Y10T 428/2991* (2015.01); *Y10T 428/2995* (2015.01); *Y10T 428/2998* (2015.01); *Y10T 428/2982* (2015.01)

(58) Field of Classification Search
CPC   C01B 31/0438; B82Y 30/00; Y10S 977/734; Y10S 977/753; Y10S 977/932; Y10T 428/2991; Y10T 428/2995; Y10T 428/2998
USPC .......... 428/402, 403, 405, 407; 977/734, 753, 977/932, 948
IPC .... C01B 31/0438; B82Y 30/00; Y10S 977/948, Y10S 977/753, 977/932, 977/734
See application file for complete search history.

(56) References Cited

U.S. PATENT DOCUMENTS 8,771,630 B2 * 7/2014 Wu et al. .................. 423/448
2005/0271574 A1 * 12/2005 Jang et al. ................ 423/448

* cited by examiner

*Primary Examiner* — Leszek Kiliman
(74) *Attorney, Agent, or Firm* — Muncy, Geissler, Olds & Lowe, P.C.

(57) ABSTRACT

The present invention relates to a nano-graphite plate structure with N graphene layers stacked together, where N is 30 to 300. The nanometer nano-graphite structure has a tap density of 0.1 g/cm$^3$ to 0.01 cm$^3$, a thickness of 10 nm to 100 nm, and a lateral dimension of 1 μm to 100 μm. The ratio of the lateral dimension to the thickness is between 10 and 10,000. The oxygen content is less than 3 wt %, and the carbon content is larger than 95 wt %. The nano-graphite plate structure has both the excellent features of the graphene and the original advantages of easy processability of the natural graphite so as to be broadly used in various application fields.

9 Claims, 3 Drawing Sheets

NANO-GRAPHITE PLATE STRUCTURE

BACKGROUND OF THE INVENTION

1. Field of the Invention

The present invention generally relates to a nano-graphite plate structure, and more specifically to a nano-graphite plate structure having the aspects and advantages of monolayer graphene and natural graphite.

2. The Prior Arts

In general, the monolayer graphite, also called graphene, has a lattice structure formed by a monolayer of carbon atoms, which are tightly packed in two-dimensional honeycomb crystal lattice by the graphite bond (sp2). Thus, the monolayer graphite has a thickness of one carbon atom. The graphite bond is a composite chemical bond derived from the covalent bond and the metallic bond, such that graphene is a perfect substance possessing both key properties of an insulator and a conductor. In 2004, Andre Geim and Konstantin Novoselov at the University of Manchester in the UK successfully proved that graphene is obtained from apiece of graphite by using adhesive tape, and were thus awarded the Nobel Prize in Physics for 2010.

Graphene is the thinnest and hardest material in the world now. It has thermal conductivity greater than that of carbon nanotube and diamond. Its electron mobility at room temperature is higher than the carbon nanotube and silicon crystal. Also, electric resistivity of graphene is even lower than that of copper or silver, and so far is considered as the material with the lowest resistivity.

In the prior arts, graphene can be produced by three methods, including graphite exfoliating, direct growth and carbon nanotube transformation. Especially, the graphite exfoliating method can be used to form graphene powder. The most suitable method for mass production is the method of redox reaction. Specifically, the graphite material is first oxidized to form graphite oxide, and it is then processed by separation and reduction reaction to obtain graphene.

U.S. Patent Publication No. 20050271574 disclosed a process for producing graphene, which comprises the steps of first performing intercalation by strong acid on a piece of natural graphite, primarily exfoliating the piece of natural graphite by suddenly contacting with a heat source, and then completely exfoliating the piece of natural graphite by using high energy grinding balls so as to form graphene powder. Whatever method is used to produce graphene, owing to the nanometer structure of graphene, the present process is not only complicated and is badly polluted, but the tap density of the manometer material is also much lower. For example, the tap density is much less than 0.01 g/cm$^3$, and the resultant volume is much larger such that it is possible to aggregate by Van der Waals forces. Therefore, it is a challenge for mass production or industrial application even graphene possesses such excellent physical properties, and it is easy to cause negative effect on derivative products.

Therefore, it is greatly needed a nanometer structure to solve the above problems in the prior arts.

SUMMARY OF THE INVENTION

The primary objective of the present invention is to provide a nano-graphite plate structure with N layers of graphene stacked together, where N is 30 to 300. Specifically, the nano-graphite plate structure has a tap density of 0.1 g/cm$^3$ to 0.01 g/cm$^3$, a thickness of 10 nm to 100 nm, and a lateral dimension of 1 μm to 100 μm. Especially, the ratio of the lateral dimension to the thickness is between 10 and 10,000.

The oxygen content of the nano-graphite structure is less than 3 wt %, and the carbon content is larger than 95 wt %. Additionally, the specific surface area of the nano-graphite plate structure is larger than 20 m$^2$/g, such that the nano-graphite plate structure has both the excellent features of the graphene and the original advantages of easy processability of the natural graphite. Therefore, it is possible to be suitably used in various application fields.

Furthermore, the nano-graphite plate structure comprises at least one surface modifying layer, which is formed on the surface of the nano-graphite plate structure, and includes at least one surface modifying agent. The surface modifying agent is primarily used to improve the surface polarity of the nano-graphite plate structure, such that the nano-graphite plate structures are easily and uniformly dispersed in the solvent, or increase the cohesion between the nano-graphite plate structures and the organic polymer so as to help manufacture various subsequent material, such as the conductive polymer, thermal conductive material, lubricant or super capacitor.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
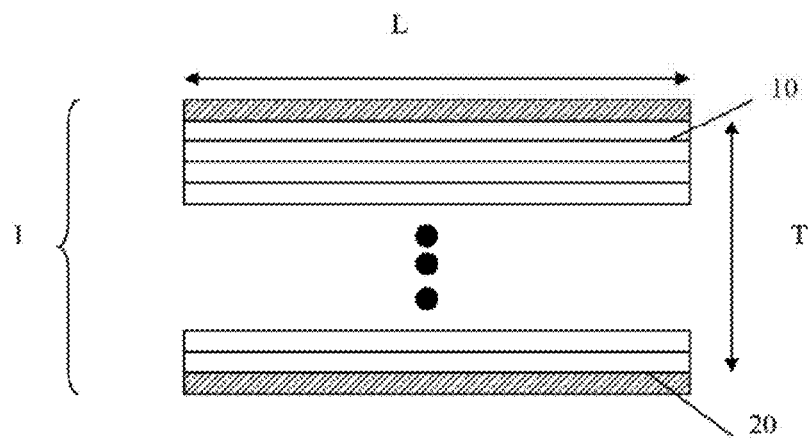
FIG. 1 is a view showing a nano-graphite plate structure according to the present invention.

Please refer to FIG. 1. As shown in FIG. 1, the nano-graphite plate structure 1 of the present invention includes N graphene layers 10 stacked together, where N is 30 to 300. The tap density of the nanometer nano-graphite structure 1 is within a range of 0.1 g/cm$^3$ and 0.01 g/cm$^3$, its thickness T is within 10 nm and 100 nm, and its lateral dimension L is within 1 μm and 100 μm. Additionally, the ratio (L/T) of the lateral dimension L to the thickness T is between 10 and 10,000.

Furthermore, the nano-graphite plate structure 1 of the present invention has the oxygen content less than 3 wt %, and the carbon content larger than 95 wt %. That is, the impurity in the nano-graphite plate structure 1 is low, so that each of graphene layers 10 can completely exhibit the characteristics of graphene. Because the thickness of the nano-graphite plate structure 1 is between those of graphene and natural graphite, and the nano-graphite plate structure 1 has the specific area greater than 20 m$^2$/g, part of the excellent aspects of graphene is sustained, and it is easy to perform processes. Therefore, the present invention is possibly used in various application fields.

Also, the nano-graphite plate structure 1 further includes at least one surface modifying layer 20 formed on the surface of the nano-graphite plate structure 1 to improve the surface polarity of the nano-graphite plate structure 1. More specifically, the surface modifying layer 20 at least contains one surface modifying agent, which includes at least two functional groups located at two ends of the surface modifying agent, respectively. One of the two functional groups is chemically bonded with certain organic functional group remaining on the surface of the nano-graphite plate structure 1, and the other of the two functional groups forms the functional surface of the nano-graphite plate structure 1. Thus, the surface characteristics of the nano-graphite plate structure 1 is changed, so that the nano-graphite plate structure is easily and evenly dispersed in certain solvent in subsequent processes, or the cohesion between the nano-graphite plate structure 1 and the organic polymer is improved to be useful for various applications. The surface modifying agent in the nano-graphite plate structure 1 is within 0.02 and 20.0 wt %, and preferably 0.1 and 10.0 wt %.

The surface modifying agent includes at least one of coupling agent, fatly acid and resin. The coupling agent generally includes two parts, wherein one part is pro-inorganic group for adhering to some inorganic filler, and the other part is pro-organic group for adhering to organic resin. Specifically, the coupling agent is expressed by a chemical structure, $M_x(R)_y(R')_z$, where M is a metal element, R is a hydrophilic functional group, and R' is a hydrophobic functional group, $0 \leq x \leq 6$, $1 \leq y \leq 20$, and $1 \leq z \leq 20$. One end of R in the coupling agent is bonded with M, and the other end of R is hydrolyzed for the corresponding hydrophilic functional group, such that the surface of the nano-graphite plate structure 1 forms chemical bonding. One end of R' is bonded with M, and the other end of R' helps the surface of the nano-graphite plate structure 1 perform specific aspects different from pure graphene powder through the above various functional groups, such as easily dispersing in organic carrier, or reacting with organic molecules.

It is preferred that R is selected from the group consisting of alkoxyl, carbonyl, carboxyl, acyloxy, amide, alkyleneoxy and alkylene-carboxyl functional groups. M is selected from the group consisting of aluminum, tanium, zirconium and silicon. R' is selected from the group consisting of vinyl, fatty-alkyleneoxyl, styryl, methylacryloxyl, acryloxyl, fatty-amino, chloroproply, fatty-thiol, fatty-thioxo, isocyanato, fatty-phenolyl, fatty-carboxyl, fatty-hydroxyl, cyclohexyl, phenyl, fatty-formyl, fatty-acetyl and benzoyl functional groups.

The coupling agent is generally silane, zirconate, aluminum zirconate, aluminate and chromate, and silane is the most common one.

The surface modifying agent is selected from fatty acid with higher carbon, which also has two functional groups at its two ends, respectively. One functional group reacts with the surface of nano-graphite plate structure 1, and the other functional group forms different surface aspects from nano-graphite plate structure 1. The fatty acid with higher carbon is selected from the group consisting of stearic acid and oleic acid. Additionally, the surface modifying agent may also be selected from resin with versatile functional groups so as to provide surface aspects different from that of the surface of nano-graphite plate structure 1. The resin is preferably selected from the group consisting of epoxy resin, polyurethane resin, silicone resin, phenolic resin and polyester resin.

With the surface modifying agent, the dispersity of the nano-graphite plate structure 1 in the solvent is greatly increased so as to enhance the affinity between the nano-graphite plate structure 1 and the organic molecules and expand its application field, such as the conductive polymer, thermal conductive material, lubricant or super capacitor.

Detailed description of the nano-graphite plate structure 1 of the present invention is shown in the following embodiments.

Embodiment 1

Figure 2:
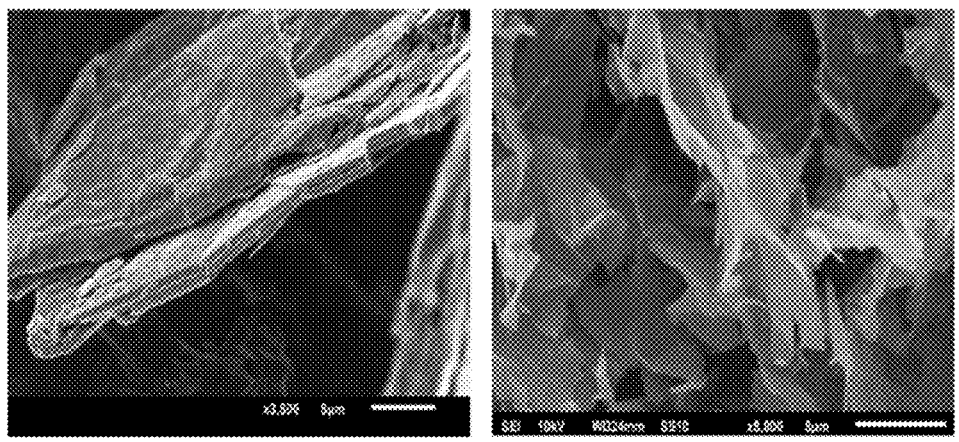
FIG. 2 is a SEM view showing the result of the comparison between the nano-graphite plate structure according to the first embodiment of the present invention and the natural graphite.
Figure 3:
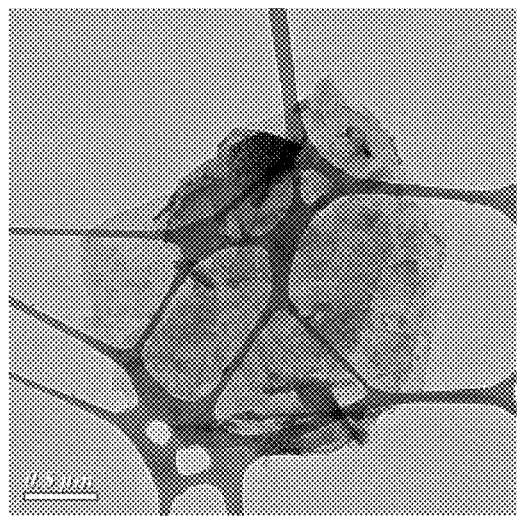
FIG. 3 is a TEM view showing the nano-graphite plate structure according to the first embodiment of the present invention.
Figure 4:
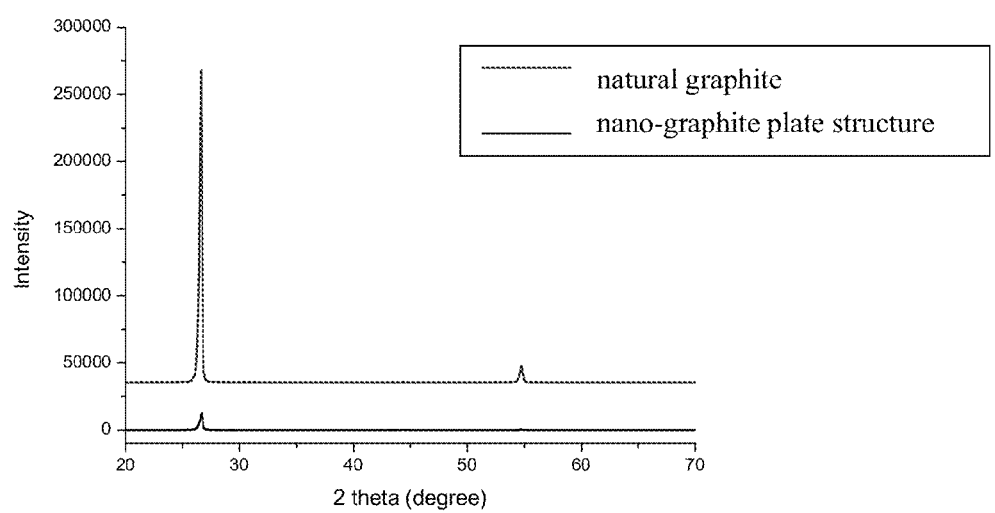
FIG. 4 shows the comparison result of the X-ray diffraction of the nano-graphite plate structure according to the first embodiment of the present invention.

The nano-graphite plate structure 1 is synthesized by the following steps. First, 5 g of natural graphite is prepared to mix with deionized water. The mixture is ground by a planetary ball mill with 1 mm zirconium oxide grinding balls for 6 hours and then ground with 0.1 mm zirconium oxide grinding balls for 12 hours. After the ground mixture is dried, the nano-graphite plate structure is formed, and has a tap density of 0.07 g/cm$^3$. As shown in FIG. 2, there are apparent differences between the nano-graphite plate structure 1 in embodiment 1 and natural graphite under SEM (Scanning Electron Microscope) examination. The nano-graphite plate structure has a thickness of about 80 nm and a lateral dimension of about 10 μm. Thus, the ratio of the lateral dimension to the thickness is about 125. FIG. 3 shows a TEM (Transmission Electron Microscope) view of the nano-graphite plate structure in embodiment 1. Clearly, the nano-graphite plate structure is a transparent sheet. With the nitrogen-oxygen analyzer, the oxygen content of the nano-graphite plate structure 1 is about 2.5 wt %, and with the BET (Brunauer-Emmett-Teller) method, its specific surface area is about 23 m$^2$/g. FIG. 4 illustrates the comparison result of the X-ray diffraction of the nano-graphite plate structure 1 in embodiment 1 and natural graphite. The characteristic peak of graphite is shown in FIG. 4. Specifically, the full-width at half maximum of the peak of (002) lattice plane is 0.296, and that of natural graphite is 0.182. Therefore, the nano-graphite plate structure of the present invention has the structural property of nanometer material.

Embodiment 2

Figure 5:
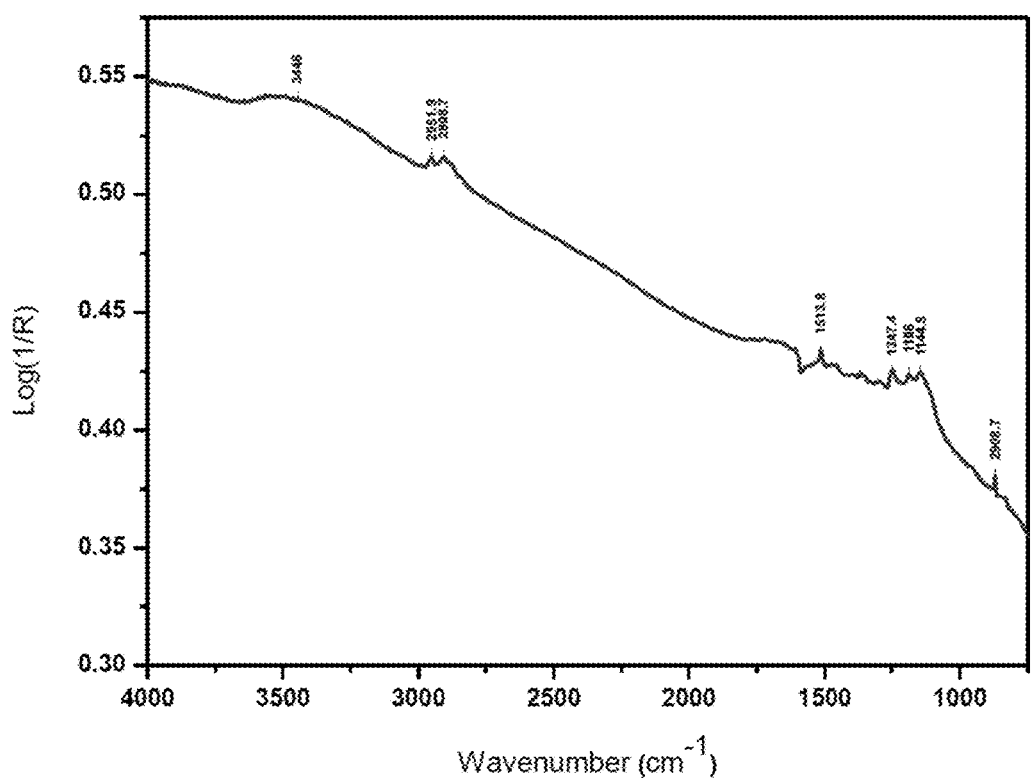
FIG. 5 is an infrared absorption spectrum of the nano-graphite plate structure with the modified surface according to the second embodiment of the present invention.

Additionally, the surface modifying agent is added in Embodiment 1. The surface modifying agent is selected from dodecyl benzene sulfonate, and other steps are the same. FIG. 5 shows the infrared absorption spectrum of the nano-graphite plate structure with the modified surface after adding the surface modifying agent. The spectrum illustrates the absorption location of the long carbon chain, and thus it is proved that the surface of the nano-graphite plate structure has a functional group of long carbon chain.

Embodiment 3

The nano-graphite plate structure is prepared by use of supercritical fluid. First, 5 g of natural graphite is placed in a high pressure reactor of 30° C. The pressure of carbon dioxide is set 75 bar such that a supercritical fluid is formed. The supercritical fluid is mixed with natural graphite for 2 hours and then the supercritical fluid is released to perfoliate the graphite layer, forming the nano-graphite plate structure with

Embodiment 4

The nano-graphite plate in Embodiment 3 is further placed in a planetary ball mill, and a solution with 3-Aminopropyl triethoxysilane dissolved in N-methylpyrrolidone is added. The mixture is ground by zirconium oxide balls for 1 hour to fully disperse the nano-graphite plate structure 1 and bond the surface modifying agent to the surface of the nano-graphite plate structure 1. Finally, the ground mixture is dried to form the surface modified nano-graphite plate structure 1, which has a thickness of about 20 nm, a lateral dimension of about 10 μm. Therefore, the ratio of the lateral dimension to the thickness is about 500.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A nano-graphite plate structure, comprising:
    N graphene layers stacked together, and N is 30 to 300; and
    at least one surface modifying layer formed on a surface of the nano-graphite plate structure and comprising at least one surface modifying agent,
    wherein the nano-graphite plate structure has a tap density within a range of 0.1 g/cm$^3$ and 0.01 g/cm$^3$, a thickness within a range of 10 nm and 100 nm, and a lateral dimension within a range of 1 μm and 100 μm, and a ratio of the lateral dimension to the thickness is between 10 and 10,000, and
    wherein the surface modifying agent in the nano-graphite plate structure is within a rang of 0.02 and 20.0 wt %.

2. The nano-graphite plate structure as claimed in claim 1, wherein the nano-graphite structure has an oxygen content less than 3 wt %, and a carbon content larger than 95 wt %.

3. The nano-graphite plate structure as claimed in claim 1, wherein the nano-graphite structure has a specific surface area larger than 20 m$^2$/g.

4. The nano-graphite structure as claimed in claim 1, wherein the surface modifying agent in the nano-graphite plate structure is within a range of 0.1 and 10.0 wt %.

5. The nano-graphite plate structure as claimed in claim 1, wherein the surface modifying agent includes at least one of coupling agent, fatty acid and resin.

6. The nano-graphite plate structure as claimed in claim 5, wherein the coupling agent has a chemical structure of $M_x(R)_y(R')_z$, M is a metal element, R is a hydrophilic functional group, and R' is a hydrophobic functional group, $0 \leq x \leq 6$, $1 \leq y \leq 20$, and $1 \leq z \leq 20$.

7. The nano-graphite plate structure as claimed in claim 6, wherein R is selected from a group consisting of alkoxyl, carbonyl, carboxyl, acyloxy, amide, alkyleneoxy and alkylene-carboxyl functional groups, M is selected from a group consisting of aluminum, titanium, zirconium and silicon, R' is selected from a group consisting of vinyl, fatty-alkyleneoxyl, styryl, methylacryloxyl, acryloxyl, fatty-amino, chloro-proply, fatty-thiol, fatty-thioxo, isocyanato, fatty-phenolyl, fatty-carboxyl, fatty-hydroxyl, cyclohexyl, phenyl, fatty-formyl, fatty-acetyl and benzoyl functional groups.

8. The nano-graphite plate structure as claimed in claim 5, wherein the fatty acid is selected from a group consisting of stearic acid and oleic acid.

9. The nano-graphite plate structure as claimed in claim 5, wherein the resin is selected from a group consisting of epoxy resin, polyurethane resin, silicone resin, phenolic resin and polyester resin.

* * * * *